Jan. 7, 1969 W. G. FRISH 3,420,157
BLANCHERS FOR FOOD PRODUCTS
Filed Aug. 30, 1967 Sheet 1 of 2

INVENTOR:
WILLIAM G. FRISH

BY *Joseph G. Nerner*
*John W. Winter*
ATTORNEYS

INVENTOR:
WILLIAM G. FRISH
BY Joseph G. Werner
John M. Winter
ATTORNEYS

United States Patent Office 3,420,157
Patented Jan. 7, 1969

3,420,157
BLANCHERS FOR FOOD PRODUCTS
William G. Frish, 302 North Ave.,
Watertown, Wis. 53094
Filed Aug. 30, 1967, Ser. No. 664,451
U.S. Cl. 99—404      4 Claims
Int. Cl. A47j 27/00

ABSTRACT OF THE DISCLOSURE

A blancher having steam injectors mounted in the closed ends of a blancher tank and immersed in a water bath for introducing steam directly into the water for heating and circulating same with a minimum of noise and vibration. The injectors have a tubular nozzle which discharges steam peripherally into a water passage defined by a cylindrical outer shroud encircling the nozzle. The water is drawn into the rear of the shroud for heating and pumped out the front end thereof for circulation in the tank.

BACKGROUND OF THE INVENTION

*Field of the invention*

This invention relates to blanchers providing continuous water immersion heat treatment for food products.

*Description of the prior art*

Blanchers have been used for many years in the canning industry for conditioning food products preparatory to further processing. Generally, blanching is performed by immersing the food product in a scalding water bath for a predetermined length of time.

In the past, the water has been heated and maintained at scalding temperatures by various means including steam pipes running through the bottom of the blanching tank, such as shown in U.S. Patent 2,551,148.

Electric heating coils have also been used in blanchers of the type represented by U.S. Patent 2,585,293.

Others have tried to inject steam directly into the water bath to heat and circulate the water; however, these attempts have been most unsuccessful because of the noise and vibration set-up in the blancher tank. Vibration caused by introducing jets of steam directly into the water bath in the blancher tends to greatly reduce the life of the blancher tank. Because of the great amount of machinery in a typical canning and food processing plant, the noise level is ordinarily extremely high. Quieter operating food processing machinery is therefore very desirable.

While injection of steam directly into the water bath in a blancher tank has been most unsuccessful up to this time, one known method of using steam injection for heating water in a blancher to reduce the noise and vibration problem is shown in U.S. Patent 3,086,444 where a jet of steam is injected into a longitudinally extending water pipe alongside of the blancher tank to heat the water which is then circulated through the blancher tank.

This patent also shows a second steam injection system which is similar in principle to the first. In this second scheme, the steam from the injector nozzles heats water in small chambers mounted on the exterior of the bottom of the blancher tank and the heated water is then forced into the tank through small openings in the bottom of the tank. The steam doesn't actually enter the tank, but instead, the heating takes place in the small chambers under the tank.

SUMMARY OF THE INVENTION

Basically, my invention is an improved blancher having a heating arrangement wherein steam jets are introduced directly into the water bath in the blancher tank through injectors having a shrouded nozzle for greatly reducing noise and vibration. The steam injectors are mounted in opposed relation in the end walls of the blancher tank and are off-set to opposite sides of the center line of the tank near the bottom thereof for imparting a substantially horizontal circulation of water in the tank for uniform heating.

The introduction of steam jets directly into the water bath in the tank in accordance with my invention both heats the water and produces the circulation thereof with maximum efficiency and a minimum of noise and vibration. The reduction of vibration greatly lengthens the life of the tank of my improved blancher.

Other objects, features and advantages of my invention will be readily apparent from the following detailed description taken in conjunction with the accompanying drawings showing a preferred embodiment exemplifying the principles of my invention.

DETAILED DESCRIPTION OF A PREFERRED EMBODIMENT

Figure 1:
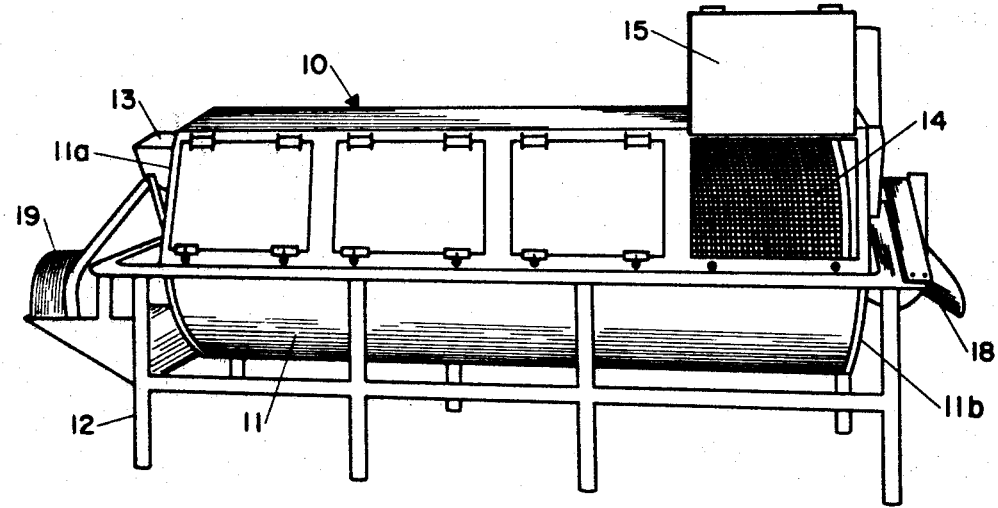
FIGURE 1 is a side perspective view of an improved blancher embodying my invention.

Referring now more particularly to the drawings wherein like numerals refer to like parts throughout the several views, a blancher embodying my invention is shown generally at 10 in FIGURE 1. The blancher shown is of the rotary type and comprises an elongate tank 11 supported in a substantially horizontal position on a multi-legged frame 12. An infeed hopper 13 is provided in one end wall 11a of the tank through which food product is fed by gravity to a rotatably mounted perforated cylinder 14 which can be seen through one of the hinged clean-out doors 15 in FIGURE 1.

Figure 2:
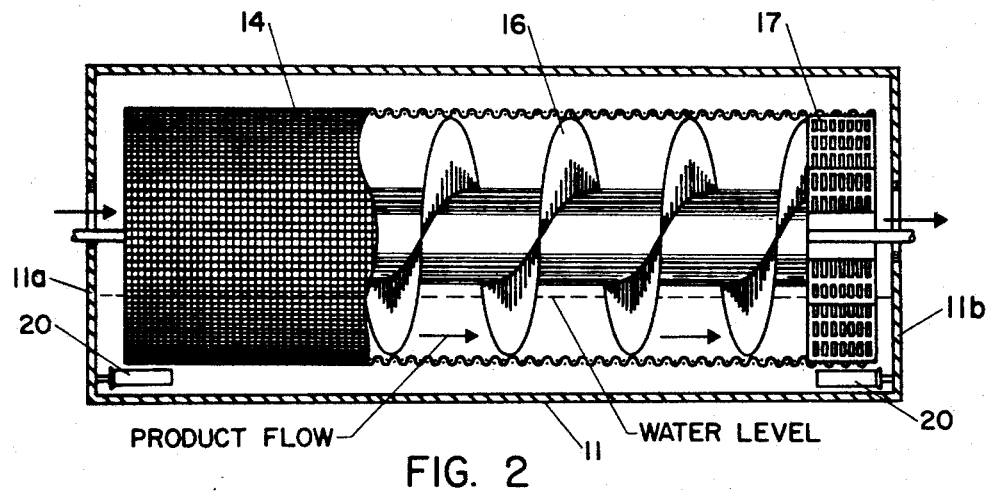
FIGURE 2 is a schematic side elevation view of the blancher showing the tank thereof in section and a portion of the rotating cylinder broken away to show the auger construction therein.

The food product dumped into the rotating cylinder 14 is moved therethrough by a spiral or internal auger 16 best shown in the schematic drawing in FIGURE 2. The internal auger 16 and cylinder 14 are constructed and rotated as a unit for moving the food product therethrough from infeed to discharge by a tumbling action.

A plurality of radially extending perforate rotating paddles 17 are provided at the discharge end of the cylinder 14 for elevating the food product out of the water bath for exit through a discharge chute 18 in the end wall 11b of the blancher tank. The cylinder, auger, and paddles are rotated as a unit by a motor 19 mounted at the infeed end of the blancher tank.

As best seen in FIGURE 2, the blancher tank holds a water bath in which the food product is immersed for blanching. The food product is continually agitated and tumbled by the revolving cylinder and auger as it moves through the water bath.

In the preferred form shown in the drawings, a pair of steam injectors 20 are mounted in opposed relation in the end walls 11a and 11b near the bottom of the blancher tank 11. The injectors 20 extend into the tank in the space between the bottom of the rotating cylinder and the bottom of the tank. As shown in the schematic plan view of FIGURE 3, the injectors 20 are off-set laterally on opposite sides of the longitudinal axis of the blancher tank 11 for setting up a substantially horizontal water circulation pattern in the tank.

Figure 4:
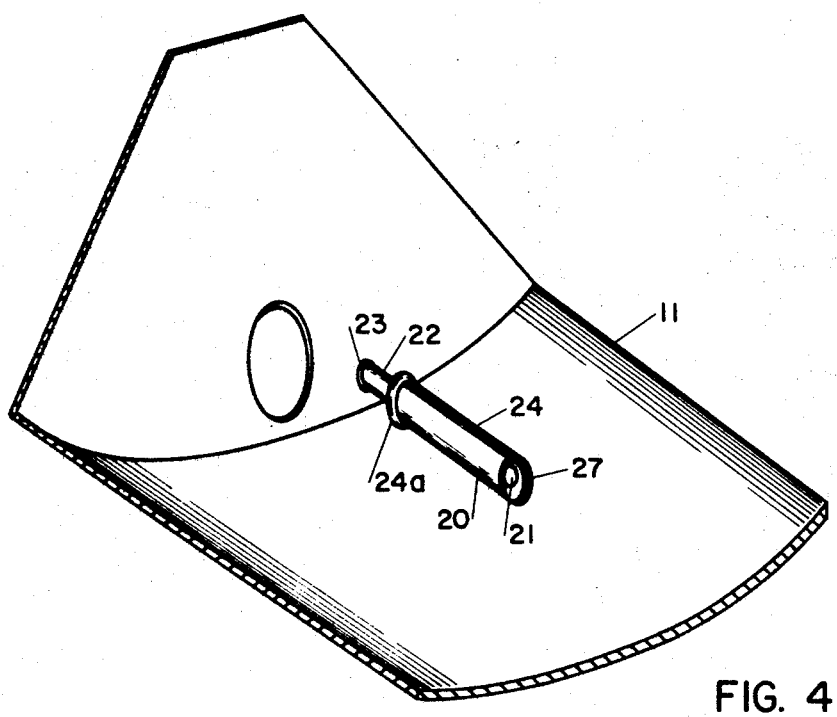
FIGURE 4 is a perspective view of one of the steam injectors.
Figure 5:
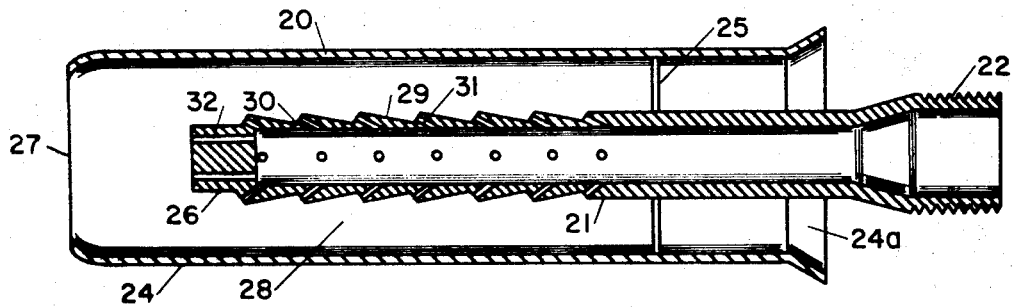
FIGURE 5 is a sectional view through one of the steam injectors.

The steam injectors 20 of my improved blancher are best shown in FIGURES 4 and 5. The injectors each have a tubular nozzle 21 having an externally threaded inlet end 22 which is turned into a threaded connector 23 in the end wall of the blancher tank. A cylindrical shroud 24 having a substantially larger diameter than the tubular nozzle 21 is mounted in rigid concentric fashion about the nozzle by a spider 25.

The rear end of the shroud 24 is preferably flared as at 24a and is spaced from the end wall of the blancher tank to provide an inlet for water. The forward or outlet end of the shroud extends beyond the outlet end 26 of the nozzle and is constricted slightly as shown at 27. The tubular nozzle 21 and cylindrical shroud 23 define an annular water passage 28 therebetween.

The outlet end 26 of the nozzle is formed into a series of frusto-conical surfaces 29 providing a plurality of substantially forwardly facing tapered peripheral edges as shown at 30 in FIGURE 5. A plurality of jet holes 31 extend through the edges 30 about the periphery of the nozzle. The jet holes 31 are disposed at an angle to the axis of the nozzle so as to direct jets of steam forwardly and outwardly into the annular water passage 28 defined within the shroud 24.

Figure 3:
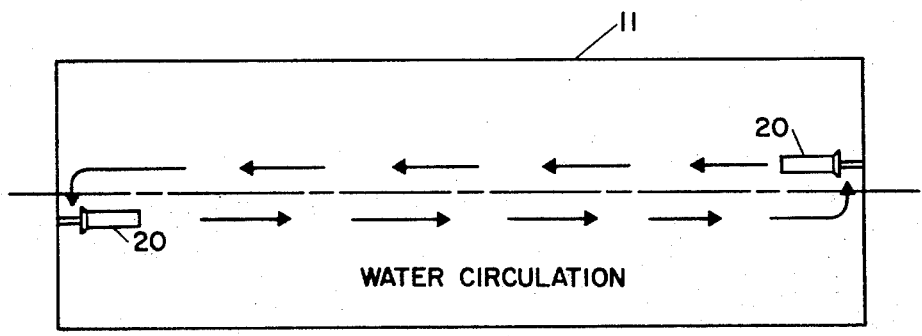
FIGURE 3 is a schematic plan view showing the placement of the steam injectors and the circulation pattern of the water in the blancher tank.

The steam jetting from the holes 31 draws water into the inlet end of the shroud for heating and forces it out the outlet end thereof to provide a substantially horizontal water circulation pattern as shown in FIGURE 3.

In the preferred form, the injector nozzle 21 has restricted openings 32 in the outlet end thereof for directing steam jets longitudinally through the shroud.

The injectors are preferably made of stainless steel and the size thereof may vary depending on the steam pressure, the volume of food product to be blanched, time, and temperature range to be maintained.

It is understood that my invention is not confined to the particular construction and arrangement of parts herein illustrated and described, but embraces all such modified forms thereof as may come within the scope of the following claims.

I claim:

1. In a blancher for providing continuous water immersion heat treatment of food products, said blancher having an elongate tank for holding a water bath, an infeed for depositing a food product in one end of said tank, an outlet for discharging the food product from said tank, and conveyor means for moving the food product deposited in the infeed of said tank to said outlet for discharge from said tank; the improvement comprising: at least one steam injector mounted on said tank for introducing steam directly into the water bath in said tank for heating and circulating the water with a minimum of noise and vibration, said injector having a tubular nozzle for receiving the steam under pressure and a substantially cylindrical open-ended shroud encircling said tubular nozzle to define a water passage therewith, said tubular nozzle having a plurality of openings about its circumference for directing jets of steam outwardly and forwardly into said passage for drawing water therethrough.

2. The improvement in blanchers as specified in claim 1 wherein said improvement comprises a pair of said steam injectors mounted in opposed end walls of said tank below the water level of the bath, the opposed steam injectors being off-set laterally of each other for setting up a substantially horizontal water circulation pattern in said tank.

3. The improvement in blanchers as specified in claim 1 wherein said nozzle has at least one restricted opening in the outlet end thereof for directing a steam jet longitudinally through said shroud.

4. In a blancher for providing continuous water immersion heat treatment for food products, said blancher having, an elongate tank for holding a water bath, said tank having opposed end walls, an infeed for depositing food product in one end of said tank, an outlet for discharging the food product from said tank, and conveyor means for moving the food product deposited in said tank to said outlet for discharge therefrom; the improvement comprising: at least one steam injector mounted on each of said opposed end walls of said tank for introducing steam into the water bath for heating and circulating the water with a minimum of noise and vibration, said injectors having a tubular nozzle mounted in the tank end walls for receiving steam under pressure and a substantially cylindrical shroud having open forward and rear ends, said shroud encircling said tubular nozzle and being mounted thereon by a spider so as to define an annular water passage with said tubular nozzle, the rear end of the cylindrical shroud of each of said injectors being adjacent the tank end wall in which the injector is mounted and being spaced therefrom a sufficient distance to allow water flow into the rear end of said shroud, said tubular nozzle having a plurality of openings about its circumference for directing jets of steam outwardly and forwardly into said annular water passage for drawing water into the rear end of said shroud, through said water passage, and out the forward end of said shroud for circulation in said tank.

References Cited

UNITED STATES PATENTS

| 1,581,933 | 4/1926 | Larsen | 99—404 |
| 2,418,519 | 4/1947 | McBeth | 99—404 |
| 2,551,148 | 5/1951 | McBeth | 99—443 |
| 2,585,293 | 2/1952 | Ashton | 99—404 |
| 3,086,444 | 4/1963 | Back | 99—239 |

ROBERT W. JENKINS, *Primary Examiner.*